United States Patent Office 2,941,968
Patented June 21, 1960

2,941,968
WATER DISPERSIBLE INTERPOLYMERS

James F. McKenna, Shorewood, Wis., assignor to Pittsburgh Plate Glass Company, Allegheny County, Pa., a corporation of Pennsylvania No Drawing. Filed Nov. 3, 1954, Ser. No. 466,653

5 Claims. (Cl. 260—23)

This invention relates to dispersing compositions which are suitable for use as coating media and it has particular relation to a composition comprising a dispersion of an interpolymerizable mixture, or an interpolymer of a mixture of:

(A) A monomer containing a $>C=CH_2$ group, preferably attached to a negative radical.

(B) An ester of one or more drying oil acids with one or more polyhydric alcohols, said ester being appropriately chemically modified to attain water dispersibility, in the manner hereinafter described.

It has heretofore been proposed to form coating compositions comprising a resin, or other suitable film forming material appropriately dispersed in a liquid medium (usually water). Such materials have much to recommend them from the standpoint of cheapness and ease of application. However, much difficulty has been encountered in the preparation of such compositions, and the materials heretofore so prepared have not in generally been satisfactory. One difficulty often encountered in the use of such materials has been a lack of stability in the dispersion compositions. The unstable materials could not be stored for any great length of time without an undue tendency of the dispersed resin component or other vehicle components such as drying oils or the like to settle out, or to de-emulsify.

Films formed from the conventional dispersions were also often characterized by a lack of hardness and toughness. Likewise, their resistance to washing and to the action of solvents was often unduly low. These constitute but a few of the more obvious difficulties which are encountered in connection with conventional dispersed finishing materials.

The present invention comprises the provision of an emulsion finish which is a dispersion in a non-solvent liquid of an interpolymer of (A) a monomer containing a $>C=CH_2$ group and, (B) an ester of a polyhydric alcohol and a drying or semi-drying oil, containing, as an addition component, an alpha-beta ethylenically unsaturated polycarboxylic acid in which the carboxyls have been appropriately neutralized by means of a suitable base. In effect, the ester contains an internal dispersing agent. The ester is also capable of interpolymerization with monomers possibly by conjoint homopolymerizations or by addition reactions with alpha-hydrogen, or by vinylic cross-linking. It is believed that addition reactions predominate; but in any event, homogeneous water dispersible materials result.

The term dispersion is employed in a generic sense to denote either finely divided but solid interpolymer in a liquid, or finely divided globules of interpolymer or interpolymerizable components disseminated in a liquid medium.

Four main stages of reaction are involved in preparing a coating material by the process herein disclosed. These comprise:

I. Effecting an addition reaction between an alpha-beta ethylenic dicarboxylic acid or anhydride and a drying oil acid ester of a polyhydric alcohol.

II. Splitting and neutralizing the anhydride rings.

III. Preparing an aqueous dispersion of the neutralized product, and $>C=CH_2$ monomer.

IV. Interpolymerizing the dispersion of ester product and the monomer.

It would appear that in accordance with the provisions of the present invention, heating of a glyceride oil or an alkyd body, which has been modified with a glyceride oil, with an alpha-beta ethylenically unsaturated dicarboxylic acid or anhydride such as maleic acid or maleic anhydride, results in an addition reaction between the ethylenic group of the dicarboxylic acid and the hydrogen atom alpha to an ethylenic group in a fatty acid radical of the oil, or an oil modified alkyd. In the latter reaction, the ethylenic group of the alpha-beta dicarboxylic acid becomes saturated while the double bonds of the fatty acid groups or radicals remain unsaturated. In the event that conjugately unsaturated acid radicals such as eleostearic acid (or radicals capable of isomerization under reaction conditions to give conjugation) are present, a Diels-Alder type reaction probably also occurs.

Both types of reaction are herein termed addition reactions since neither involves removal of water. Other reactions may occur to a limited extent and are not precluded.

It is also permissible partially to alcoholize a glyceride oil with a polyhydric alcohol such as glycol, glycerol, pentaerythritol, or the like to provide glycerides containing free hydroxyls which can, in part, react with maleic anhydride through esterification, thus providing polyesters of alkyd bodies in which the dicarboxylic acid component is unsaturated. If sufficient maleic acid or anhydride is employed, it will be apparent that the latter type of esters may also be further modified by addition, or by Diels-Alder reactions between the ethylenic group of the maleic anhydride and the carbons of the fatty acid chain in well known manner.

In order to attain water dispersibility of the addition products of an alpha-beta ethylenic dicarboxylic acid and a drying oil, or an alkyd body which has been modified with a drying oil, the acid or anhydride groups should be neutralized with a base such as ammonia, an amine, or other similar volatile alkaline material. It has also been found to be desirable, as a preliminary step to such neutralization, to subject the material to hydrolysis with an aqueous medium such as water in order to effect splitting of the anhydride rings. This may readily be effected by boiling the addition products containing the anhydride rings with water. Subsequently, the free carboxyls can be neutralized with the base material. Splitting of the anhydride rings and neutralization may also occur concurrently.

The neutralized product constitutes a salt which is water dispersible and which can also be mixed with an ethylenically unsaturated monomer such as styrene, or other monomer materials hereinafter enumerated containing $>C=CH_2$ groups, usually attached to a negative radical. The mixtures of a monomer and the salt can then be polymerized in the manner conventionally employed to polymerize dispersions of ethylenically unsaturated compounds to provide useful coatings.

The main components of the interpolymerizable mixtures of this invention are then:

(1) A drying glyceride oil, or an alkyd containing the acids of such oil reacted with an alpha-beta ethylenic dicarboxylic acid or anhydride.

(2) Water.

(3) A monomer containing a $>=CH_2$ group, various catalysts and modifiers dispersing agents and the like may be included in the reaction mixture.

Auxiliary components such as chain stoppers and other modifiers may also be added.

It will be recognized that in the practice of this invention, the several components of the system above described can be selected from relatively broad classes of materials. For example, a primary or base component which is modified with the alpha-beta unsaturated dicarboxylic acid may be any one of a large number of drying or semi-drying glyceride oils. Of these oils, linseed oil and soya oil are preferred. However, the invention does not preclude other oils such as perilla oil and safflower oil.

The glyceride oils may be directly reacted with an alpha-beta ethylenic dicarboxylic acid or anhydride, or they may be subjected to preliminary alcoholysis with polyhydric alcohols such as glycerol, pentaerythritol, mannitol, or even ethylene or diethylene glycol. These alcoholysis reactions are well understood in the preparation of alkyd resins. The product of the alcoholysis may then be interacted with an excess of maleic anhydride or similar anhydride of an alpha-beta ethylenic acid to provide a product which contains acid groups, some of which are incorporated by ester linkages while others are incorporated by addition with carbon in the hydrocarbon portion of the fatty acid.

The glyceride oils may also be replaced, if so desired, by conventional oil modified alkyd resins in which the oil, such as one of those above described, is subjected to alcoholysis with one of the precedingly described polyhydric alcohols in a well known manner, and the product is then reacted with a non-ethylenic dicarboxylic acid such as phthalic acid, sebacic acid, or adipic acid in addition to the alpha-beta unsaturated acid anhydride.

The use of various oil varnish compositions including numerous synthetic or natural gums or resins dissolved therein by cooking at an elevated temperature in the well known manner employed in the varnish making art is also included within the scope of the invention.

As previously indicated, in the practice of the invention, the base material comprising a glyceride oil, or an appropriate derivative of such oil, such as an alkyd resin, or a varnish composition, is appropriately treated for purposes of obtaining inherent dispersibility thereof. A first step in such treatment involves subjecting the oil or the desired derivative thereof, to addition reaction with an ethylenically unsaturated dicarboxylic acid or anhydride. The alpha-beta ethylenic acid anhydride component may be selected from anhydrides of acids such as maleic acid, citraconic acid, ethyl maleic acid, diethyl maleic acid, and methyl-ethyl maleic acid.

This addition reaction involves conventional so-called "maleinization" and may readily be effected by heating a mixture of water-free oil, or one of the alkenyl derivatives previously described, to a temperature of about 175° C. to 300° C. (preferably to about 200° C. to 250° C.) until a unified homogeneous product is obtained. This contains drying oil fatty acids having dicarboxylic acid, or anhydride groups attached thereto.

Subsequently, the dicarboxylic acid anhydride groups are neutralized with a base. To this end, however, it is often preferable first to open the anhydride rings by hydrolysis. This is easily effected if the mixture is boiled under reflux and with mechanical agitation and preferably under an inert atmosphere. Concurrently, or subsequently, the product should be neutralized, or rendered slightly alkaline with an appropriate base, such as ammonium hydroxide, or an amine, such as ethylamine, methylamine, diethylamine, dimethylamine or other suitable water soluble basic materia. This converts the material to an aqueous dispersion.

Subsequently, the dispersion is incorporated with the copolymerizable compound containing a terminal $>C=CH_2$ group, preferably attached to a negative radical, for example, by agitating the two components together. Usually, a soluble catalyst of copolymerization such as is used in synthetic latices for synthetic rubber, is also included in the mixture. The catalyst preferably is soluble in water or one of the resin components. Persulfates such as ammonium persulfate, or alkali metal persulfates are usually preferred in dispersion polymerizations, but other catalysts such as hydrogen peroxide may be used. Still other catalysts include cumene hydroperoxides, diisopropyl benzene hydroperoxide, diazothioethers such as p-methoxyphenyl diazothio-(2-naphthyl) ether, p-chlorobenzoyl peroxide and others. Reducing agents such as sodium bisulfite and others may be added to provide a redox system. Preferably oxygen is excluded insofar as practicable during the reaction. In the presence of such catalysts, the copolymerizable mixture heats up by exothermic reaction during the initial stages and within a short period of time, dispersed polymerized product is obtained.

Appropriate $>C=CH_2$ compounds adapted to copolymerize with the dispersion of modified oil compound usually are attached to a negative group. They include substantially any of the so-called "monomers" which have heretofore been suggested as being adapted for copolymerization with the polyesters of ethylenically unsaturated carboxylic acids and glycols.

These monomeric compounds include styrene, which is one of the least expensive and more common compounds of the class. The homologue of styrene known as alpha-methyl styrene may be substituted for styrene. Likewise, homologues containing substituents in the benzene ring of styrene may be employed. Vinyl toluene, which is a mixture of 60 percent para and 40 percent isomers of methyl substituted styrene, constitues an example of one such material the use of which results in products of exceptional value. Other ethylenically unsaturated compounds containing the $>C=CH_2$ group and which are adapted to be copolymerized with the dispersions of the present invention include halides of ethylenically unsaturated compounds, such as vinyl chloride. Still other examples of compounds containing a $>C=CH_2$ group include the esters of certain alcohols which are ethylenically unsaturated. In this class are included diallyl phthalate, diallyl sebacate, allyl acetate, and allyl propionate. Likewise, vinyl esters such as vinyl acetate and others may be employed. The invention also includes the use of the esters of acids containing a $>C=CH_2$ group. In this class are included the acrylic esters such as methyl acrylate, ethyl acrylate, and allyl acrylate. The invention further includes the use of esters of inorganic acids, such as phosphoric acid, and unsaturated alcohols such as allyl alcohol. Compounds of this class include diallyl and triallyl phosphates and others.

These several components of the dispersed interpolymers may be employed in a relatively broad range of proportions with respect to each other. It is thus possible to "tailor" the dispersions to meet a wide range of requirements, such as may be encountered in the general use of the materials.

The alpha-beta ethylenic polycarboxylic acid is usually incorporated with the drying oil, semi-drying oil or the derivatives thereof, in such amount that upon reasonable cooking of the acid or its anhydride, the acid or anhydride is taken up to provide a so-called "maleinized" oil or product which, upon being boiled with water under a reflux condenser and upon addition of a volatilizable base, will readily form a dispersion of reasonable viscosity. The maleic acid may, for example, be added in an amount which will provide a product having an acid value of about 50 to 150 or thereabouts. The proportion of the dicarboxylic acid may, for example, be within a range of 5 to 40 percent by weight, based upon glyceride oil or derivative thereof employed in the reaction.

In order to obtain the best dispersion characteristics in the maleinized oil, it has been determined that the most satisfactory products are usually obtained when the dicarboxylic acid, e.g. maleic acid, is employed in a proportion of about 10 to 20 percent by weight of the mixture of oil and meleic anhydride. Especially satisfactory products, which are oil-in-water dispersions, are obtained when the maleic anhydride constitutes about 15 to 17 percent of the mixture. Lower proportions of the dicarboxylic acid or anhydride, e.g., maleic anhydride, could be reacted with the oil, but the dispersion characteristics for presently contemplated purposes seem to be less satisfactory than with higher proportions. Of course, even higher proportions of maleic anhydride could be added, but they tend to increase the acidity of the product, which for some purposes, is undesirable.

The water for dispersion purposes is added to the maleinized product in an amount to obtain a desired degree of viscosity and desired film thickness. The viscosity, of course, is a readily observable property of the mixture undergoing treatment. Water may, for example, comprise 25 to 95 percent by weight of the mixture.

The proportion of the monomer compound containing the $>C=CH_2$ group employed in the copolymerized mixture will, to a considerable extent, depend upon the hardness desired in the finished product, as well as the resistance to abrasion and scrubbing and also, upon the speed of setting required when the mixture is applied to a surface to provide a film. Usually the increase of the proportion of the ethylenically unsaturated compound tends to increase the hardness of the ultimate films, and also to increase the speed of hardening. The ethylenic monomer containing the group $>C=CH_2$ may, for example, comprise about 20 to 70 percent by weight of the copolymerizable solid components of the mixture. A range of about 45 to 57 percent of the ethylenic compound is near the optimum for most purposes.

The dispersion mixtures comprising monomer and esters of oil acids treated with the dicarboxylic acids can be polymerized at a temperature in a range of about 20° C. to 100° C. Optimum temperatures seem to be about 65° C. to 90° C. The polymerization time varies from about 2 to 25 hours depending on the degree of conversion desired.

The dispersion compositions of the present invention may be modified with various natural and synthetic resins and gums which are, of themselves, of dispersible character, especially when they are incorporated with the dispersions herein disclosed. Appropriate modifiers of this character include esters of rosin and polyhydric alcohols such as polyethylene glycols, pentaerythritol, mannitol or the like. These esters may be formed in situ. The dispersed compositions of the present invention may be added to other water dispersion finishes. For example, latices heretofore employed as dispersion finishes may be modified by means of the herein disclosed dispersed copolymers.

It will be apparent that various pigments, fillers, and coloring materials may be incorporated with the herein disclosed dispersion finishes. Examples of such materials include titanium dioxide, lithopane, pulverized mica, finely divided silica or calcium carbonate, ultramarine and many others.

The herein disclosed copolymer dispersions, while being designed primarily for use as coating media, may also be employed as a source of molding powder suitable for use in various molding operations. The dispersions may, for example, be precipitated or coagulated by the addition of an appropriate agent, such as a brine of ordinary salt. The precipitate, after being duly washed to remove soluble constituents, may then be dried at a temperature sufficiently low to obviate cohesion of the particles, thus forming a moldable powder.

Specific applications of the principles of the invention are illustrated by the following examples:

EXAMPLE I

This example illustrates the use of soybean oil as a starting material. Twenty-four hundred grams of soya oil, together with 600 grams of maleic anhydride, were heated at a temperature of about 250° C. for 1½ hours, in a five-liter, three-neck flask which was fitted with a mechanical stirrer, a reflux condenser, and a temperature recording device such as a thermometer. The product had an acid value of 101. It was an addition product of the oil and the maleic anhydride.

In order to open the anhydride rings, a 350 gram sample of the addition product was placed in the same flask with 1000 grams of distilled water and was boiled for 1 hour while a stream of nitrogen gas was bubbled slowly through the liquid in order to prevent undue oxidation. The nitrogen flow was maintained during the remainder of the experiment. The sample was cooled to 80° C. and an additional 200 grams of distilled water was added.

The product was neutralized and made alkaline by means of 113 grams of a 28 percent solution of ammonia in water and was inherently dispersible. An interpolymerizable dispersion was prepared by agitating it with 5 grams of a catalyst, namely, ammonium persulfate and 650 grams of styrene. It was observed that a noticeable exothermic reaction ensued, during which the batch heated up to 95° C. in a period of 10 minutes. In order to prevent the loss of volatile reactants, the mixture was cooled to prevent further heating. After about 20 minutes, the exothermic reaction subsided and the mixture was heated externally in order to maintain a temperature of about 85° C. to 90° C., which temperature was maintained for five hours. At the conclusion of that time, the mixture was cooled to room temperature and was ascertained to be a stable dispersion polymer product. A glass panel was coated with the dispersion and the water evaporated to leave a hard, clear, transparent film.

A particularly satisfactory product comprised a dispersion of a rosin-pentaerythritol modified linseed oil of 30 gallon oil length. (By 30 gallon oil length, it is meant that the mixture contained oil in a proportion of 30 gallons per 100 pounds of the rosin-pentaerythritol reaction product.) The preparation of this product was conducted as follows:

EXAMPLE II

A five-liter flask having three necks and being fitted with a reflux condenser, a mechanical stirrer, and a thermometer as described in Example I, was employed as a reaction vessel. Into this flask were charged 2,400 grams of linseed oil and 117 grams of pentaerythritol. The mixture was heated up to 200° C. in a period of 3¾ hours. About 2 grams of litharge was added as an ester interchange catalyst and the reaction mixture was held at the foregoing temperature for an additional hour, or until all of the pentaerythritol was observed to have reacted. The batch was then allowed to cool down to 180° C. and 840 grams of rosin was added, and the reflux condenser was removed. The reaction mixture was blanketed with a slow but steady stream of inert gas, namely nitrogen, and the mixture was heated up and maintained at a temperature of 250° C. over a period of one hour. It was held at the latter temperature for about 7½ hours or until the acid number had dropped to 16.

The resultant varnish was cooled slightly and 700 grams of maleic anhydride was added. The inert gas was shut off and the reflux condenser was returned to the flask. The batch was heated to 245° C. during a period of three hours and was maintained within the range of 235° C. to 245° C. for an additional hour. The product was also called a "maleinized" varnish.

In order to hydrolyze the same, 1280 grams was charged into the flask above described and 1250 grams of distilled water was added. The reflux condenser, the mechanical stirrer, and the thermometer were returned to the flask. The flask was also provided with a nitrogen gas inlet tube which terminated just above the surface of the liquid. A slow but steady stream of nitrogen gas was flowed into the flask and in order to blanket the liquid throughout the reaction, the mixture was heated to the boiling temperature which was maintained for one hour.

In order to neutralize and disperse the product of hydrolysis, 1250 grams of distilled water and 360 grams of a 28 percent solution of ammonia in water were added.

In order to prepare a dispersed interpolymer from the neutralized and dispersed product of hydrolysis, 1250 grams of styrene and 8 grams of ammonium persulfate were added separately and the temperature was brought to 85° C. and was maintained within the range of 85° C. to 90° C. for 8½ hours, after which the resultant dispersed polymer product was allowed to cool down to room temperature and was discharged into an appropriate container. This dispersion was found to be stable for more than one year. The dispersion could be spread as a film upon surfaces of wood, metal, stone or the like and dried to a hard, durable state.

Another dispersion of copolymerized styrene and maleic acid modified linseed oil was made up as follows:

EXAMPLE III

In this example, 2550 grams of linseed oil and 450 grams of maleic anhydride were charged into the flask as described in the preceding examples. The flask was again equipped with a reflux condenser, a mechanical stirrer and a thermometer. The charge was heated to 250° C. in a period of one hour and was so held for two hours, after which it was allowed to cool somewhat and was discharged into a storage container. This material was an addition product which had a Gardner-Holdt viscosity of Z-2, a color of 12 on the Gardner-Holdt scale, and an acid number of 76.

A mixture comprising 430 grams of the linseed oil, maleinized as above described, and 500 grams of distilled water was charged into the flask of the preceding examples. The flask was again fitted with reflux condenser, mechanical stirrer, and thermometer. The mixture was heated to boiling temperature and was refluxed for one hour to open the anhydride rings.

At the end of this period, 113 grams of 28 percent ammonia in water was dissolved in 500 grams of distilled water and this mixture was added to the flask to provide a solution which was determined to be alkaline. In this instance, a nitrogen gas inlet tube was extended slightly below the surface of the liquid and a slow but steady stream of nitrogen gas was bubbled through the batch for the remainder of the steps of treatment.

In order to form an interpolymer, there were added 7 grams of ammonium persulfate and 570 grams of styrene. This resulted in an exothermic reaction and the temperature rose to 75° C. The temperature was allowed to remain at that value for about five minutes, after which it was lowered to 60° C. over a period of about 20 minutes by means of cold water applied as a bath to the outside of the flask. It was observed that the viscosity of the reaction mixture passed through a maximum as polymerization progressed. After a period of 5⅔ hours at 60° C., the product was cooled to room temperature and was then discharged through a strainer into a storage container. The yield was 2081 grams of dispersion which constituted 97.6 percent by weight based upon the original styrene and maleinized linseed oil charged into the reaction flask.

This dispersion could be spread upon surfaces and dried to provide hard, durable films. Likewise, it could be coagulated in the manner previously referred to in order to provide a molding powder product. Furthermore, it could be incorporated with filler materials such as have been previously described or with other resins or dispersions to provide additionally modified products.

It has been indicated that vinyl toluene (which as before stated is a commercial mixture of about 40 percent of meta and 60 percent of para compound), constitutes a satisfactory ethylenically unsaturated compound for copolymerization with the maleinized products previously described. The interpolymerization reaction, in dispersions containing this material in place of styrene, proceeds very readily.

The following example illustrates the use of vinyl toluene in place of styrene in the preparation of an emulsion composition:

EXAMPLE IV

In this example, a varnish of 50 gallon oil length was prepared by reacting 6400 grams of linseed oil with 170 grams of pentaerythritol in the presence of about 5 grams of litharge (catalyst of ester interchange reaction) at 220° C. for one hour. In this reaction, a 12 liter flask having three necks and being fitted with a heating mantle, reflux condenser, a mechanical stirrer, and a thermometer, was employed as a container. The reaction mixture, prepared as above described, was cooled slightly and 1510 grams of rosin was added, and the batch was reheated to 250° C., where it was held without reflux, but with inflow of inert gas, until the acid number had dropped to 17. The reaction mixture comprising alcoholized and rosinized linseed oil was subsequently allowed to cool slightly and 1640 grams of maleic anhydride was added. When the mixture was heated to 235° C. a vigorous exothermic reaction took place and the temperature rose quickly to 255° C. It was held at a range of 242° C. to 255° C. for one hour. The reaction was then deemed to be complete and the product was cooled and discharged to storage. The product had an acid value of 94. It was an alkyd like body containing maleic radicals, introduced by esterification, as well as groups introduced into the fatty acid radicals by addition.

The anhydride rings of the radicals incorporated by addition were opened in a 550 gram sample by placing the same in a five-liter flask such as was employed in Examples I, II, and III and being again equipped with a reflux condenser, a mechanical stirrer and a thermometer and adding 500 grams of water. The mixture was heated to the boiling point and was held thereat for one hour.

The mixture was then made alkaline by the addition of a solution of 113 grams of 28 percent ammonia in 500 grams of distilled water.

The nitrogen gas inlet tube was then extended just below the surface of the liquid in the flask and a steady stream of nitrogen was introduced during the subsequent steps of the reaction. Vinyl toluene in an amount of 450 grams and a catalyst (ammonium persulfate) in an amount of 7 grams were added successively to provide an interpolymerizable mixture and the batch was maintained at 80° C. for a period of 4¼ hours. As the polymerization reaction proceeded, it was observed that the viscosity increased decidedly, and to counteract this tendency, 400 grams of distilled water was added. After this addition, the temperature was again raised to 80° C. and was held at this point for 7¾ hours, during which time it was again necessary to add 400 grams of distilled water. At the conclusion of this period, the reaction was deemed to be complete. The product was an interpolymer of vinyl toluene and the addition product of the oil and maleic acid salt. The batch was discharged into a container and cooled. The product when made up to 31.4 solids content was a pasty dispersion. It could be rendered adequately fluid for application purposes by dilution with water to 22 percent solids content. The dispersion was catalyzed by the addition of a cobalt drier in an amount of 5 percent based upon the solids content of the dispersion. The catalyzed dispersion was then poured out on a glass panel and dried to a film. After the film had been aged for a period of 5½ weeks, it was observed to be very hard and to have excellent adhesion to the glass panel. Its resistance to water and to solvents was very good.

The following example illustrates the replacement of a portion of the styrene of the preceding examples by alpha methyl styrene:

EXAMPLE V

In this example, 300 grams of the maleinized oil product prepared as in Example III and having a body of Z–2, color of 12 and an acid number of 76, was mixed with 500 grams of distilled water in the flask described in Example III. The flask was also equipped with the reflux condenser, the mechanical stirrer and a thermometer employed in the latter example. The mixture in the flask was heated to the boiling point in a period of about 25 minutes and was held at that temperature under reflux for about one hour or until the anhydride rings were split.

At the conclusion of this time, a solution of 90 grams of 28 percent ammonium hydroxide dissolved in 500 grams of distilled water was added to the batch to render it alkaline.

The nitrogen gas inlet tube was inserted in the liquid and again a slow but steady stream of gas was bubbled into the batch during the remaining stages of the operation. To the alkaline solution, obtained by the addition of ammonium hydroxide, was added 7 grams of ammonium persulfate (catalyst) and a solution comprising 210 grams of alpha methyl styrene and 490 grams of styrene. The reaction temperature of the mixture rose from 60° C. to 90° C. in a period of about 15 minutes, and was held at that temperature for 3½ hours, after which, it was allowed to cool down to room temperature and stand overnight. The next day, the product was strained through a wire screen. An 85.1 percent yield of resin was obtained in this experiment. The product, when poured out as a film upon a glass panel, dried to provide a film which was hard and had good adhesion to the panel.

The following example illustrates the preparation of a pigmented wall finish material which can be spread on a surface and dried to provide a protective and/or decorative film of good characteristics:

EXAMPLE VI

In this example, a dispersed copolymer was prepared which comprised 57 percent of styrene and 43 percent of linseed oil maleinized in the manner described in Example III with 15 percent of maleic anhydride. A mixture of 80 grams of yellow-orange pigment, 200 grams of yellow pigment, 270 grams of ultramarine blue pigment, 250 grams of pulverized mica, 1000 grams of lithopane, and 1500 grams of titanium dioxide was dispersed in 1000 grams of water containing 200 grams of 5 percent tetrasodium pyrophosphate solution and 300 grams of 2 percent solution of high viscosity carboxymethyl cellulose. A 200 gram sample of this paste was mixed with 210 grams of the copolymer in the form of a water dispersion of 40 percent by weight solids content and containing 20 grams of a 2 percent solution of high viscosity carboxymethyl cellulose. The product was a wall paint of light green color which was observed to have good application properties and after it had been dried for several weeks, it had good water and alkali resistance and could be washed to remove soil without spoiling the appearance of the painted surface. Samples of this material, after storage for a period of two years in sealed cans, even when only one half full, were still stable and no deterioration could be detected.

The following example illustrates the use of the copolymerized dispersion compositions of the present invention as modifiers for a conventional latex of styrene and butadiene copolymer:

EXAMPLE VII

Linseed oil was reacted with maleic anhydride to provide an addition product which comprised 15 percent by weight maleic anhydride. This product was hydrolyzed, neutralized and then dispersed with styrene and was polymerized to provide a product which comprised styrene and maleinized oil in the relative proportions of 57 and 43 percent by weight. The dispersion was made up to 43 percent solids in water. A pigment paste of the following composition was also made up:

1500 grams of titanium dioxide
1000 grams of lithopane
250 grams of pulverized mica
270 grams of ultramarine blue
80 grams of yellow orange pigment
200 grams of 5 percent tetrasodium pyrophosphate solution in 1000 grams of water
300 grams of a 2 percent solution of high viscosity carboxymethyl cellulose (dispersing agent)

A 418 gram sample of this paste was mixed with 66 grams of the dispersion previously described, 380 grams of a commercially available synthetic latex of a copolymer of butadiene and styrene, 25 grams of a 2 percent solution of a high viscosity carboxymethyl cellulose, 1 milliliter of a 6 percent solution of a commercial cobalt drier and 115 grams of water.

A light green wall paint was thus obtained which was tested as a coating on a wall board panel and was found to have good characteristics. The coatings when aged for 5 days were quite resistant to scrubbing.

The dispersion copolymers herein disclosed may be formulated to provide enamels which can be used to coat porous surfaces and for coating metal primer films.

As previously stated, the compositions may also be employed in the preparation of finely divided molding powders. In such application, it is desirable to coagulate the dispersion and to dry the coagulum. The resultant powder can then be molded into desired shapes. In such applications, products derived from maleinized linseed oil are of particular advantage. The following is a detailed example illustrating the preparation and molding of such composition:

EXAMPLE VIII

In this example, 500 grams of a linseed oil product containing 15 percent of maleic anhydride and being prepared in accordance with a method outlined in Example III and having a body of Z–2, color of 12 and an acid number of 76 was mixed with 600 grams of distilled water in a 5 liter flask having the same appurtenances described in Example III. The charge was heated to its boiling point in a period of about 20 minutes and was held at that point under reflux for one hour. At the conclusion of that time, a solution of 113 grams of 28 percent ammonium hydroxide mixed with 600 grams of distilled water was added to dissolve the acid product. Nitrogen gas was then supplied slowly. To the alkaline mixture that was obtained, were successively added 5 grams of ammonium persulphate and 500 grams of styrene. The emulsion was cooled from 67° C. to 60° C. in a period of about 10 minutes, and was held at the latter value for 6¼ hours. It was then cooled to room temperature overnight. The next day, it was coagulated by the addition of 2400 grams of a saturated sodium chloride solution which had been acidified with 75 grams of concentrated sulphuric acid. The coagulum was collected on a filter, washed thoroughly with water ad was dried in an oven at 140° F. for 22 hours. A yield of 1077 grams was obtained. A 14 gram sample of this powder was introduced into a mold and formed into a solid bar, the dimensions of which were 3½ by 1 by ¼ inches. The powder was moldable into solid coherent bodies of various shapes and designs. The powder could also be mixed with pulverulent fillers such as wood flour, finely divided silica and the like. Such mixtures could also be molded.

From the foregoing description of the invention, it is apparent that the emulsifiable interpolymer products of this invention constitute a novel and useful class of coating materials. It will also be apparent, therefore, that numerous variations and modifications may be made in the procedures described without departing from the spirit and scope of the invention as defined in the appended claims.

I claim:

1. In a method of forming a water dispersible material which when spread as a film, will dry to a hard, water-resistant state, the steps of heating to a temperature of about 175° C. to about 300° C., a mixture consisting essentially of glyceride drying oil and 5 to 40 percent by weight of maleic anhydride, whereby to effect addition reaction between the two, breaking the anhydride rings by adding water and hydrolyzing the product by refluxing the mixture, neutralizing the hydrolyzed product with ammonium hydroxide to form a mixture consisting essentially of the neutralized product, adding to the neutralized product about 20 to about 70 percent by weight of a material of the class consisting of styrene, vinyl toluene and alpha methyl styrene, and heating the mixture at a temperature of about 20° C. to about 100° C. until a liquid interpolymer, which is said water dispersible material, is formed.

2. A water dispersible, liquid interpolymer product as obtained by the method of claim 1.

3. A dispersion comprising water and the material as defined in claim 2, the water constituting from about 25 to about 95 percent by weight of the dispersion.

4. In a method of forming a water-dispersible material which when spread as a film, is adapted to dry to a hard, water-resistant state, the steps of heating to a temperature of 175° to 300° C. a mixture consisting essentially of a glyceride-drying oil and 5 to 40 percent by weight of maleic anhydride, whereby to effect addition reaction between the two, breaking the anhydride rings by hydrolyzing the product with water, neutralizing the hydrolyzed product with ammonium hydroxide, forming a mixture consisting essentially of the neutralized product and 20 to 70 percent by weight of styrene and heating the mixture to a temperature of about 20° C. to about 100° C. to form a liquid interpolymer which is said water dispersible material.

5. A water dispersible, liquid interpolymer obtained by the method of claim 4.

References Cited in the file of this patent

UNITED STATES PATENTS

| | | |
|---|---|---|
| 2,033,131 | Ellis | Mar. 10, 1936 |
| 2,404,836 | Gerhart et al. | July 30, 1946 |
| 2,586,092 | Robinson | Feb. 19, 1952 |
| 2,647,094 | Hahn | July 28, 1953 |